United States Patent [19]
Graham

[11] Patent Number: 4,827,972
[45] Date of Patent: May 9, 1989

[54] PRIORITY FLOW CONTROL VALVE

[76] Inventor: Larry V. Graham, P.O. Box 36, Mardsen, Saskatchewan, Canada, S0M 1P0

[21] Appl. No.: 134,766
[22] Filed: Dec. 18, 1987
[51] Int. Cl.[4] .................... F16K 11/00; F16K 15/06
[52] U.S. Cl. .............................. 137/512; 137/533.31; 137/537; 251/284
[58] Field of Search ............ 137/112, 113, 512, 537, 137/541, 533.31; 251/284

[56] References Cited

U.S. PATENT DOCUMENTS

| | | |
|---|---|---|
| 683,273 | 9/1901 | Grey . |
| 730,085 | 6/1903 | Berg . |
| 1,349,515 | 8/1920 | Lombard ................. 137/541 X |
| 1,925,610 | 9/1933 | Shinn . |
| 1,958,155 | 5/1934 | Watkins .................. 137/113 X |
| 2,179,460 | 11/1939 | White ..................... 251/284 X |
| 2,754,659 | 7/1956 | Dick . |
| 2,764,175 | 9/1956 | Mercier et al. . |
| 2,996,077 | 8/1961 | Taggert .................. 137/537 |
| 3,145,723 | 8/1964 | Chorkey . |
| 3,451,424 | 6/1969 | Gardner et al. ......... 137/512 |
| 3,508,568 | 4/1970 | Kowalski et al. . |
| 3,756,273 | 9/1973 | Hergesbach ............. 137/541 X |
| 4,266,568 | 5/1981 | Kuykendall ............. 137/533.31 X |
| 4,368,752 | 1/1983 | Tamamori et al. ...... 137/112 |

Primary Examiner—Stephen Hepperle
Attorney, Agent, or Firm—Stanley G. Ade; Adrian Battison; Murray Thrift

[57] ABSTRACT

An automatic switching valve mounted between two fluctuating pressure sources automatically switches from one source to the other to supply gas or liquid from the source that is under the higher pressure. A T-housing conveys gas or liquid from either side and out of the central stem. Tapered, spring loaded plugs or valves in either side engage with tapered seats and are maintained in contact with the seats by springs which permit one or the other valve to open when the pressure on one valve exceeds the tension of the spring of the other valve. If the pressure is equal on both sides, both valves will open simultaneously if pressure is greater than cracking pressure.

20 Claims, 1 Drawing Sheet

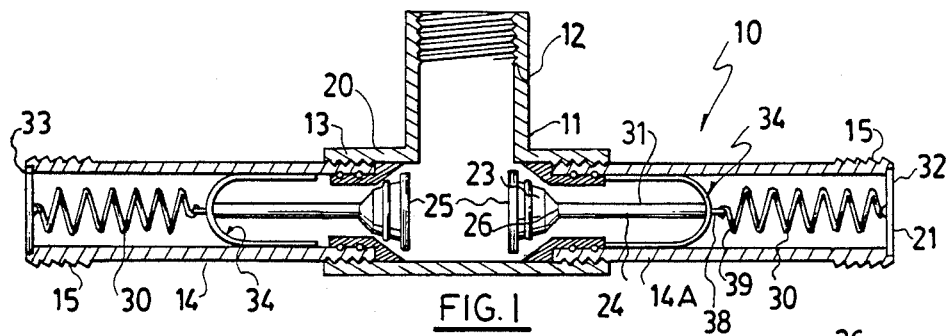
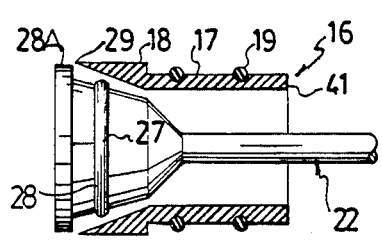
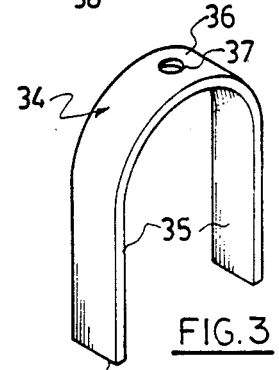
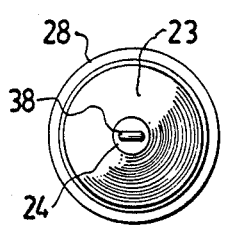
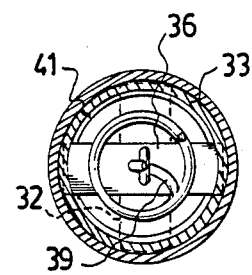
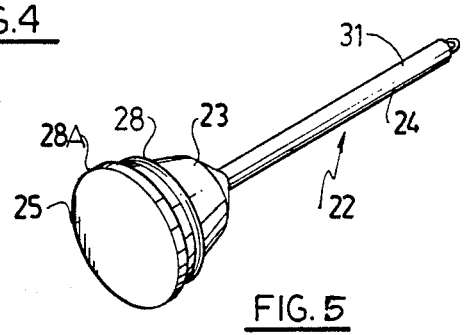

PRIORITY FLOW CONTROL VALVE

BACKGROUND OF THE INVENTION

This invention relates to new and useful improvements in priority flow control valves and consists of an automatic switching valve which is mounted between a pair of sources of gas or liquid under pressure in which the pressure of at least one of said sources fluctuates and which automatically switches the valve to supply the gas or liquid that is under the higher pressure. However, if the pressure is equal on both sides, both valves will open simultaneously if the pressure is above the cracking pressure.

For example, the valve could be mounted between two gas sources such a propane gas and natural gas that supply a pump jack motor in an oil well. The regulator on the propane tank would be set at the minimum pressure required to operate the system but propane would only be consumed when there was not enough natural gas present.

This supply of natural gas in oil well pumping normally is available from the oil well that is being pumped and of course the use of this natural gas is of considerable benefit to the oil industry as it is available free of charge from the oil well.

However, such a source does fluctuate in pressure and quantity hence the necessity for a standby tank of propane under pressure which of course is far more expensive than using the free source of natural gas from the oil well.

Under this particular condition, only one source would be fluctuating in pressure, namely, the source of natural gas from the oil well whereas the propane, providing sufficient supply is maintained, is at a relatively constant pressure.

Another example might be a remote source of natural gas from another well together with the natural gas from the well being pumped. Under this condition, both sources might well fluctuate so that the valve operates always to supply gas from the source of higher pressure.

DESCRIPTION OF PRIOR ART

Prior art known to Applicant comprise the following U.S. Patents:

(1) U.S. Pat. No. 683,273—S. P. Grey—Sept. 24, 1901—shows an automatic cylinder cock for a steam engine adapted to permit the water of condensation to freely escape at each stroke of the piston without any waste of steam in effecting the drainage of the cylinder and consists of a solid rod connection between two ball valves.

(2) U.S. Pat. No. 730,085—E. J. G. E. Berg—June 2, 1903—illustrates a cylinder relief valve comprising a pair of valves with a common spring therebetween.

(3) U.S. Pat. No. 1,925,610—B. H. Shinn—Sept. 5, 1933—describes a pressure operated two way valve useable in hydraulic jacks or hydraulic braking systems and having a cylindrical pressure chamber, entry to which is controlled by two inwardly opening spring loaded inlet valves which open and close alternately and are controlled by a pressure responsive element in communication with the pressure chamber and operatively connected to both valves.

(4) U.S. Pat. No. 2,754,659—W. W. Dick—July 17, 1956—shows a balanced valve for distributing liquid fuel in which a pair of valve elements are mounted on a common shaft and operate in opposite directions to one another.

(5) U.S. Pat. No. 2,764,175—J. Mercier et al—Sept. 25, 1956—shows a pair of ball valves with a common rod therebetween and a single spring operatively connecting to one ball valve.

(6) U.S. Pat. No. 3,145,723—W. J. Chorkey—Aug. 25, 1964—illustrates and described a combination shuttle valve for hydraulics which incorporates a pair of relief valves in a single housing which can operate as a combination shuttle and relief valve. A moveable shuttle valve member is seated in a conduit between the pair of valves and can be moved against one of the valves to close off fluid flow while permitting fluid to flow through the other valve.

(7) U.S. Pat. No. 3,508,568—S. Kowalski et al—Apr. 28, 1970—illustrates a pressure responsive valve assembly utilizing a Belleville washer in place of the usual flexible diagram or sliding piston.

The present invention is particularly suited for use with the control of gas to operate the pump jack in oil well pumping although of course it can be used in other environments.

In accordance with the invention there is provided a priority flow control valve for use with two sources of gas or liquid under pressure in which the pressure of at least one of said sources may fluctuate; comprising in combination a housing, said housing having a pair of inlet conduits and an outlet conduit, the inner ends of said inlet conduits both communicating with the inner end of said outlet conduit, a valve seating situated within said inner ends of each of said inlet conduits, and a valve element having a head and a stem extending therefrom, with said head selectively engageable with each respective valve seating, a multipurpose mounting element detachably secured to the distal end of the stem of each valve and tension spring means extending between each said distal end of the valve stem and the respective inlet conduit upstream of said respective valve stem and normally holding said valve head in sealing relationship with the respective valve seat.

Another advantage of the present invention is the sealing relationship between the tapered valves and corresponding seats together with the means to limit the movement of the valves in either direction thereby eliminating jamming.

A still further advantage of the invention is to provide a device in which the two valves operate independently and are controlled by independent springs.

Still another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a longitudinal section of the housing showing the arrangement of the valves therein.

FIG. 2 is an enlarged side elevation of one of the valve and valve seat constructions.

FIG. 3 is an isometric view of the mounting element for the valves.

FIG. 4 is an end view through one of the inlet ports.

FIG. 5 is an isometric view of one of the valves.

FIG. 6 is an end view of the valve of FIG. 5 taken from the stem end.

In the drawings like characters of reference indicate corresponding parts in the different figures.

DETAILED DESCRIPTION

Proceeding therefore to describe the invention in detail, reference should first be made to FIG. 1 which shows a substantially T-shaped housing collectively designated 10 having a central T-shaped portion 11 which includes an outlet conduit 12 communicating with two inline inlet portions 13 into which are screw threadably engaged, nipples 14 and 14A. These nipples are bored to provide a machined surface as will hereinafter be described and the distal ends are screw threaded as at 15 so that they may be connected to two independent sources of gas or liquid under pressure (not illustrated).

These nipples are also screw threadably engaged within the portions 13 as shown in the drawings and a further nipple or conduit (not illustrated) is connected to the screw threaded end of the outlet 12 and may convey the gas or liquid to the desired location.

Each inlet conduit is provided with a valve assembly collectively designated 16 which includes a cylindrical valve seat portion 17 having a conical seat 18 formed in one end thereof as shown in detail in FIG. 2.

A pair of O-rings 19 are situated in spaced and parallel relationship within annular grooves formed in the outer surface of the cylindrical portion 17 and these engage the inner ends of the conduits 14 thus locating the valve seats in the correct location with the conical taper at ends 18 being adjacent and communicating with the outlet conduit 12 situated between the inner ends 21 of the nipples 14 and 14A.

A valve element collectively designated 22 is provided for each seating and includes the conical head 23 and a stem 24 extending axially therefrom with the larger diametered end 25 of the conical head being remote from the stem which extends from the apex 26 of the cone.

An annular groove 27 extends around the conical head intermediate the ends thereof and an O-ring 28 is seated within this ring and engages the conical seat 18 when in the closed position. This O-ring contact gives adequate sealing, prevents any jamming from occurring and also cleans away any grit with the wiping action as the valve engages and disengages the seating.

The inward motion of the valve 22 is limited by a flange 28A extending from the periphery of the larger diametered end 25 which engages the end 29 of the valve seating at a predetermined pressure of gas or liquid on the head 25. This prevents the relationship between the valve and the seating from any binding contact.

The valves are normally maintained upon their seats by means of tension springs 30 secured by one end to the distal end 31 of the valve stems 24 and by the other end to a clip 32 spanning the outer ends 15 of the inlet conduits and seating within a recess or seat 33 formed in these outer ends as shown in FIGS. 1 and 4.

These tension springs apply predetermined tension to the valve elements and maintain them on their seats in sealing relationship until the pressure of gas or fluid in the inlet conduit exceed this pressure at which time the valve will open from the seat and allow the gas or fluid to flow to the outlet conduit 12.

The valve elements 22 are mounted by means of a combination mounting element 34 shown in detail in FIG. 3. It is a U-shaped strip of resilient metal or plastic having two spaced and parallel legs 35 and a curved cross piece 36 being apertured centrally thereof as at 37. This engages within the bores of the inlet conduits 14 and 14A with the curved ends 36 situated towards the outer ends 32 thereof as clearly shown in FIG. 1. An eyelet or eyebolt 38 extends through the aperture 37 in the mounting element and screw threadably engages axially within the stem 24 of the valve and the inner end 39 of the spring 30 hooks into this eyelet or eyebolt and is mounted thereby with the other end of the spring engaging over the crossbar or clip 32.

The outer sides of the legs 35 bear against the machined inner wall of the bore of the inlet nipples or conduits and centralize the valve in its relationship with the valve seat.

The distal ends 40 of the legs 35 engage the ends 41 of the cylindrical portions 17 of the valve seats as the valve opens thus limiting the amount of opening and preventing damage from occurring to springs 30 if excessive pressures are encountered.

This mounting element also acts as an anti-oscillator to stop the valve from oscillating at high speeds by creating a slight amount of drag on the walls of the inlet conduits. Curbing this oscillation reduces wear from occurring on the valve and/or valve seat.

In operation, the springs control the pressure at which the valves crack or open thus preventing opening below a predetermined pressure from either source.

Once this pressure is exceeded, the valve will open in the inlet conduit having the greatest pressure and if this pressure drops or the pressure in the other conduit exceeds this pressure, then it will open causing the other valve to close due to the higher pressure gas acting upon the head of the other valve thus automatically selecting the gas or liquid supply that is under the higher pressure.

The tapered valve seats are formed from an anti-corrosive material to prevent excessive wear and/or deterioration from occurring.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A priority flow control valve for use with two sources of gas or liquid under pressure in which the pressure of at least one of said sources may fluctuate; comprising in combination a housing, said housing having a pair of inlet conduits and an outlet conduit, the inner ends of said inlet conduits both communicating with the inner end of said outlet conduit, a valve seating situated within said inner ends of each of said inlet conduits, and a valve element having a head and a stem extending therefrom, with said head selectively engageable with each respective valve seating, a multipurpose mounting element detachably secured to the distal end of the stem of each valve, moveable therewith and co-operating with the walls of the bore of the relevant inlet conduit to centralize the valve with the seat thereof and cooperating with stop means in said inlet conduit to limit the endwise opening movement of said valve and tension spring means extending between each said distal end of the valve stem and the respective inlet conduit upstream of said respective valve stem and normally holding said valve head in sealing relationship with the respective valve seat.

2. The control valve according to claim 1 in which said mounting means for each valve comprises a substantially U-shaped resilient strip including a pair of spaced and parallel legs and a cross member extending between the outer ends thereof, said cross member spanning the distal end of the valve stem and means centrally of said cross member for detachably securing said cross member to said stem, said means also anchoring one end of said spring to said distal end of said stem.

3. The control valve according to claim 2 in which the legs of said mounting means engage the walls of said conduit thereby centering said valve, said stop means on the inner end of said valve seat, the distal ends of said legs engaging with said stop means to limit the movement of said valve element in the open position.

4. The control valve according to claim 1 in which said valve head is conical with the larger diameter end being remote from said valve stem, said seat being conical to match said valve head with the larger diameter of said seat being at the downstream end of said inlet conduit and a flange lip extending outwardly from the periphery of said large diameter of said valve head engageable with the larger diameter end of said seat to limit the engagement of said valve head within said seat thereby preventing binding from occurring and seal means around the conical surface of said head engaging the conical surface of said seat when said valve is closed to ensure a sealing relationship therebetween.

5. The control valve according to claim 2 in which said valve head is conical with the larger diameter end being remote from said valve stem, said seat being conical to match said valve head with the larger diameter of said seat being at the downstream end of said inlet conduit and a flange lip extending outwardly from the periphery of said large diameter of said valve head engageable with the larger diameter end of said seat to limit the engagement of said valve head within said seat thereby preventing binding from occurring and seal means around the conical surface of said head engaging the conical surface of said seat when said valve is closed to ensure a sealing relationship therebetween.

6. The control valve according to claim 3 in which said valve head is conical with the larger diameter end being remote from said valve stem, said seat being conical to match said valve head with the larger diameter of said seat being at the downstream end of said inlet conduit and a flange lip extending outwardly from the periphery of said large diameter of said valve head engageable with the larger diameter end of said seat to limit the engagement of said valve head within said seat thereby preventing binding from occurring and seal means around the conical surface of said head engaging the conical surface of said seat when said valve is closed to ensure a sealing relationship therebetween.

7. The control valve according to claim 1 in which said valve seat includes a conical seat portion and a cylindrical mounting portion upstream of said conical portion, sealing means around said cylindrical portion and engaging the wall of said inner end of said inlet conduit in sealing relationship one with the other.

8. The control valve according to claim 2 in which said valve seat includes a conical seat portion and a cylindrical mounting portion upstream of said conical portion, sealing means around said cylindrical portion and engaging the wall of said inner end of said inlet conduit in sealing relationship one with the other.

9. The control valve according to claim 3 in which said valve seat includes a conical seat portion and a cylindrical mounting portion upstream of said conical portion, sealing means around said cylindrical portion and engaging the wall of said inner end of said inlet conduit in sealing relationship one with the other.

10. The control valve according to claim 4 in which said valve seat includes a cylindrical mounting portion upstream of said conical portion, sealing means around said cylindrical portion and engaging the wall of said inner end of said inlet conduit in sealing relationship one with the other.

11. The control valve according to claim 8 in which said valve seat includes a cylindrical mounting portion upstream of said conical portion, sealing means around said cylindrical portion and engaging the wall of said inner end of said inlet conduit in sealing relationship one with the other.

12. The control valve according to claim 9 in which said valve seat includes a cylindrical mounting portion upstream of said conical portion, sealing means around said cylindrical portion and engaging the wall of said inner end of said inlet conduit in sealing relationship one with the other.

13. The control valve according to claim 9 in which the upstream end of said cylindrical mounting portion also constitutes said stop means.

14. The control valve according to claim 12 in which the upstream end of said cylindrical mounting portion also constitutes said stop means.

15. The control valve according to claim 8 which includes a pair of spaced and parallel O-rings, annular seats for said O-rings in said cylindrical mounting portion thereby mounting said valve seat within said inlet conduit, means mounting the other end of said spring to the upstream end of said inlet conduit, said last mentioned means including a seating formed in the upstream end and a clip engaging within said seat and spanning said upstream end, said other end of said spring being secured centrally of said clip.

16. The control valve according to claim 9 which includes a pair of spaced and parallel O-rings, annular seats for said O-rings in said cylindrical mounting portion thereby mounting said valve seat within said inlet conduit, means mounting the other end of said spring to the upstream end of said inlet conduit, said last mentioned means including a seating formed in the upstream end and a clip engaging within said seat and spanning said upstream end, said other end of said spring being secured centrally of said clip.

17. The control valve according to claim 11 which includes a pair of spaced and parallel O-rings, annular seats for said O-rings in said cylindrical mounting portion thereby mounting said valve seat within said inlet conduit, means mounting the other end of said spring to the upstream end of said inlet conduit, said last mentioned means including a seating formed in the upstream end and a clip engaging within said seat and spanning said upstream end, said other end of said spring being secured centrally of said clip.

18. The control valve according to claim 12 which includes a pair of spaced and parallel O-rings, annular seats for said O-rings in said cylindrical mounting portion thereby mounting said valve seat within said inlet conduit, means mounting the other end of said spring to the upstream end of said inlet conduit, said last mentioned means including a seating formed in the upstream end and a clip engaging within said seat and spanning said upstream end, said other end of said spring being secured centrally of said clip.

19. The control valve according to claim 13 which includes a pair of spaced and parallel O-rings, annular seats for said O-rings in said cylindrical mounting portion thereby mounting said valve seat within said inlet conduit, means mounting the other end of said spring to the upstream end of said inlet conduit, said last mentioned means including a seating formed in the upstream end and a clip engaging within said seat and spanning said upstream end, said other end of said spring being secured centrally of said clip.

20. The control valve according to claim 14 which includes a pair of spaced and parallel O-rings, annular seats for said O-rings in said cylindrical mounting portion thereby mounting said valve seat within said inlet conduit, means mounting the other end of said spring to the upstream end of said inlet conduit, said last mentioned means including a seating formed in the upstream end and a clip engaging within said seat and spanning said upstream end, said other end of said spring being secured centrally of said clip.

* * * * *